United States Patent
Simmons et al.

(10) Patent No.: US 8,155,444 B2
(45) Date of Patent: Apr. 10, 2012

(54) IMAGE TEXT TO CHARACTER INFORMATION CONVERSION

(75) Inventors: Alex J. Simmons, Seattle, WA (US); Radoslav P. Nickolov, Bellevue, WA (US); Peter Baer, Duvall, WA (US); Vincent Lascaux, Seattle, WA (US); Igor Kofman, Buffalo Grove, IL (US)

(73) Assignee: Microsoft Corporation, Redmond, WA (US)

( * ) Notice: Subject to any disclaimer, the term of this patent is extended or adjusted under 35 U.S.C. 154(b) by 934 days.

(21) Appl. No.: 11/623,184

(22) Filed: Jan. 15, 2007

(65) Prior Publication Data

US 2008/0170785 A1   Jul. 17, 2008

(51) Int. Cl.
*G06K 9/34* (2006.01)
*G06K 9/03* (2006.01)
*G06F 3/048* (2006.01)

(52) U.S. Cl. .......................... 382/176; 382/310; 715/764
(58) Field of Classification Search .................... 382/176
See application file for complete search history.

(56) References Cited

U.S. PATENT DOCUMENTS

| | | | |
|---|---|---|---|
| 5,159,667 A | 10/1992 | Borrey et al. | 395/148 |
| 5,619,594 A | 4/1997 | Melen | 382/233 |
| 5,859,929 A * | 1/1999 | Zhou et al. | 382/175 |
| 5,905,811 A | 5/1999 | Shiiyama et al. | 382/229 |
| 5,930,393 A * | 7/1999 | Ho et al. | 382/225 |
| 6,047,093 A * | 4/2000 | Lopresti et al. | 382/310 |
| 6,101,274 A * | 8/2000 | Pizano et al. | 382/176 |
| 6,249,283 B1 * | 6/2001 | Ur | 715/764 |
| 6,256,408 B1 * | 7/2001 | Casey et al. | 382/170 |
| 6,453,079 B1 | 9/2002 | McInerny | 382/311 |
| 6,480,304 B1 * | 11/2002 | Os et al. | 358/474 |
| 6,532,461 B2 * | 3/2003 | Evans | 715/200 |
| 6,577,755 B1 * | 6/2003 | Lorie | 382/140 |
| 6,735,347 B1 * | 5/2004 | Bates et al. | 382/282 |
| 6,760,491 B2 | 7/2004 | Lange et al. | 382/321 |
| 6,766,069 B1 * | 7/2004 | Dance et al. | 382/309 |
| 6,782,144 B2 * | 8/2004 | Bellavita et al. | 382/310 |
| 6,876,763 B2 * | 4/2005 | Sorek et al. | 382/162 |
| 6,907,132 B1 * | 6/2005 | Salomon | 382/101 |
| 7,027,973 B2 | 4/2006 | Macklin | |
| 7,092,870 B1 | 8/2006 | Chen et al. | 704/9 |
| 7,111,011 B2 | 9/2006 | Kobayashi et al. | |
| 2002/0008715 A1 * | 1/2002 | Sorek et al. | 345/698 |
| 2002/0051575 A1 * | 5/2002 | Myers et al. | 382/202 |
| 2004/0131279 A1 * | 7/2004 | Poor | 382/287 |
| 2004/0240735 A1 * | 12/2004 | Medina | 382/173 |

(Continued)

OTHER PUBLICATIONS

"SimpleOCR", http://www.dirfile.com/simpleocr.htm, 2004.

(Continued)

*Primary Examiner* — David Zarka
(74) *Attorney, Agent, or Firm* — Merchant & Gould (57) ABSTRACT

Converting text may be provided. A user selectable element may be used to select a text. The selected text may include a first text within an electronic document and a second text within an image. The second text within the image may be converted to character information by receiving the image. The image may have image character information and an image type. An aspect of the received image may be adjusted based on the image type. Optical character recognition may be performed on the adjusted image to extract character information. The character information may include characters and corresponding location information for the characters. The extracted character information may be evaluated to improve the recognition quality of the extracted character information as compared to the image character information.

15 Claims, 5 Drawing Sheets

U.S. PATENT DOCUMENTS

| | | | |
|---|---|---|---|
| 2005/0097080 A1 | 5/2005 | KethiReddy et al. | 707/3 |
| 2005/0123200 A1* | 6/2005 | Myers et al. | 382/182 |
| 2005/0196071 A1 | 9/2005 | Prakash et al. | |
| 2005/0289182 A1 | 12/2005 | Pandian et al. | |
| 2006/0062453 A1 | 3/2006 | Schacht | 382/164 |
| 2006/0120629 A1* | 6/2006 | Myers et al. | 382/321 |
| 2007/0041629 A1* | 2/2007 | Prakash et al. | 382/139 |

OTHER PUBLICATIONS

"Find Desktop Standard 1.73", http://www.sharewareplaza.com/Find-Desktop-Standard-download_32475.html, 2006.

"Document Image Managers", http://www.byte.com/art/9505/sec11/art7.htm, 2005.

Chinese First Office Action dated Oct. 12, 2010 cited in Application No. 200880002169.3.

International Search Report dated Jun. 11, 2008 cited in Application No. PCT/US2008/050173.

European Supplementary Search Report dated Apr. 11, 2011 cited in Application No. 08713490.4.

Wilbert O. Galitz, "The Essential Guide to User Interface Design," Jun. 15, 2002, 3 pgs., XP-002625166.

A. Dengel et al., "Techniques for Improving OCR Results," Handbook of Character Recognition and Document Image Analysis, Chapter 8, pp. 277-258, Jan. 1, 1997, XP-002402960.

Chinese Decision on Rejection dated Jan. 6, 2012 cited in Application No. 200880002169.3, 16 pgs.

European Office Action dated Jan. 19, 2012 cited in Application No. 08 713 490.4, 5 pgs.

* cited by examiner

IMAGE TEXT TO CHARACTER INFORMATION CONVERSION

BACKGROUND

A text editor is a software application used to create and edit files such as electronic documents. In some situations, the text editor may be used to record information such as notes taken in a class or business meeting. For example, a user (e.g. a student) may take notes during a class using a computer and text editing software. The notes taken by the student in the electronic document may include images. The images in the electronic document, for example, may contain visible embedded text or a picture of text located within an image.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

First, with a user selectable element, a selection text comprising a first text within an electronic document and a second text within an image located in the electronic document may be selected. Then, in response to selecting the selection text, the second text within the image may be converted to character information.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Consistent with embodiments of the invention, a text editor may allow a user to insert many different content types on its pages. These content types, for example, may be text, handwriting (e.g. digital ink), pictures, screen clipping, audio, etc. Embodiments of the invention may help users find what they are looking for in the document editor regardless of content type. For example, pictures (joint photographic experts group (JPEG), bitmap (BMP), etc.) can be searched, with text inside the picture highlighted, when the user runs a search in the text editor. The user may not have to specify that the text the user is looking for is in a picture. Rather embodiments of the invention may allow the text editor to search through all of the different content types. And, like all of the other content types, the text editor may perform optical character recognition (OCR) and index the pictures in the background, without the user having to do anything. Consequently, when the user searches for something, it may be found regardless of the content type in which a hit corresponding to the search occurs.

The text editor, consistent with embodiments of the invention, may try to make logical decisions about where the picture originated when deciding on an OCR type to run. Because different sources may have different characteristics, better results may be obtained is a recognition engines know something about from where the image came.

Figure 1:
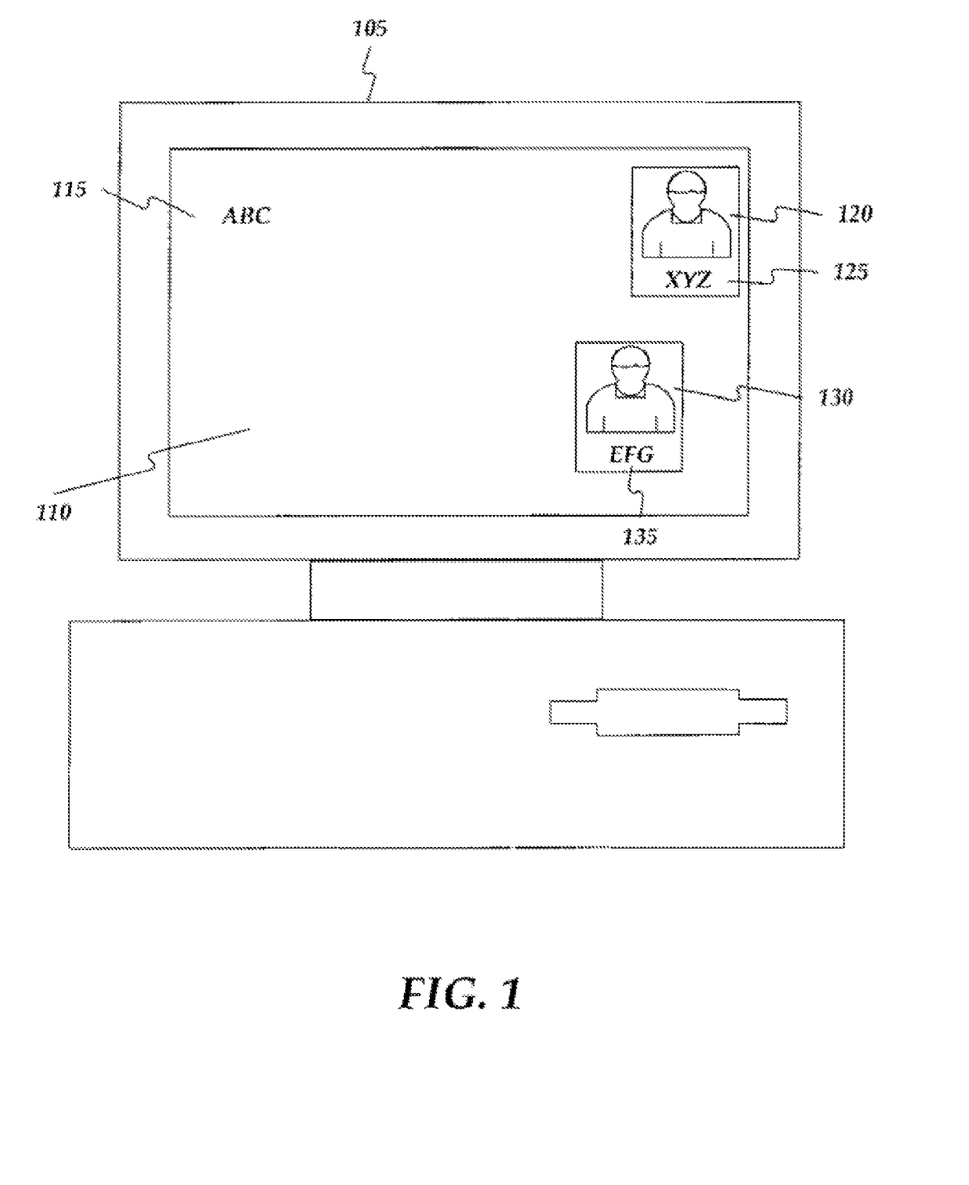
FIG. 1 is an operating environment.

FIG. 1 shows an operating environment consistent with embodiments of the present invention. A computing device 105 may display an electronic document 110. Electronic document 110 may contain a first text 115, a first image 120, and a second image 130. First image 120 and second image 130 may respectively contain a second text 125 and a third text 135. Embodiments of the present invention may allow a user to select first text 115 and, for example, second text 125 with one user selectable element even though second text 125 is within first image 120.

Figure 2:
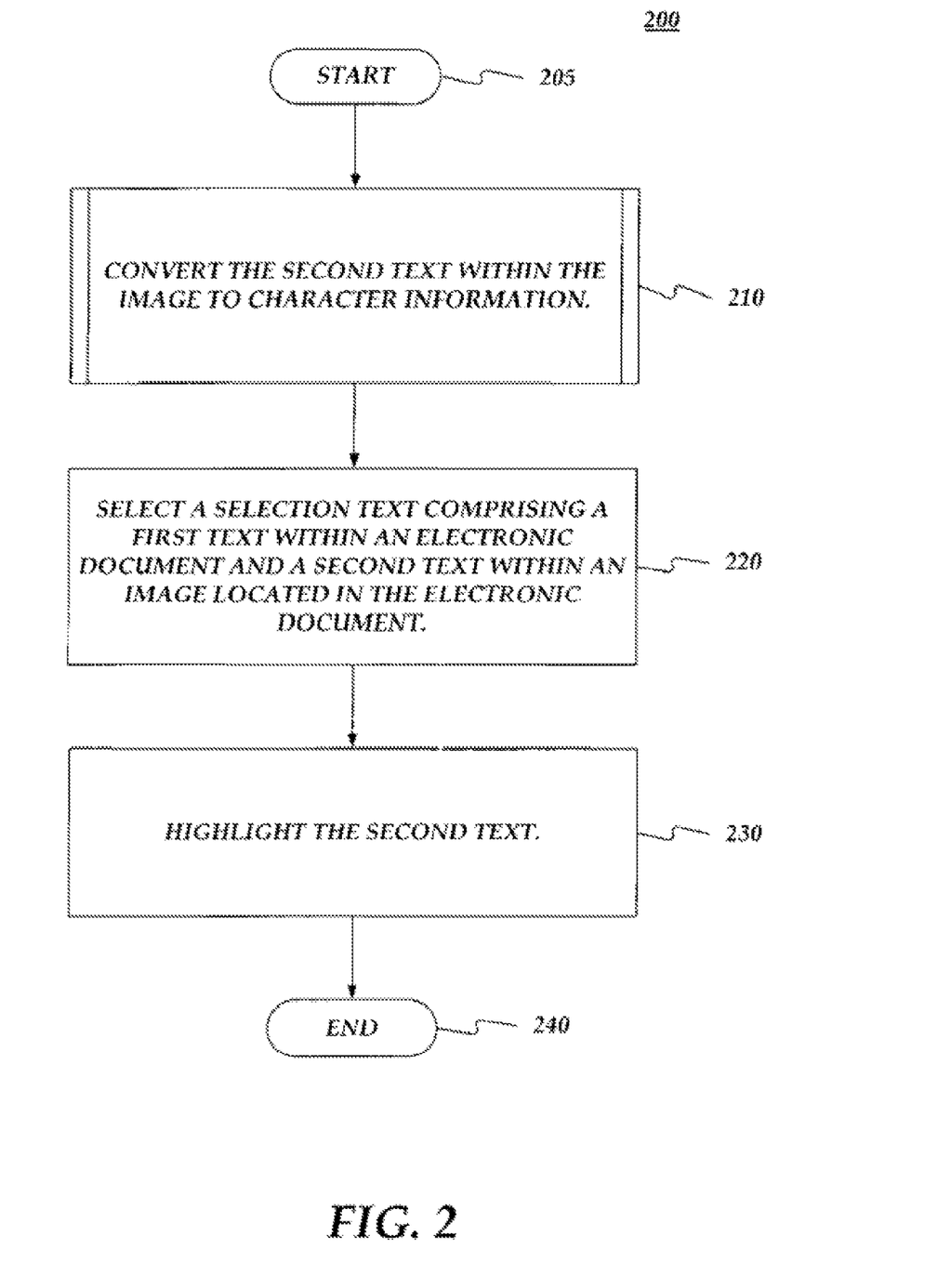
FIG. 2 is a flow chart of a method for providing converting text.
Figure 3:
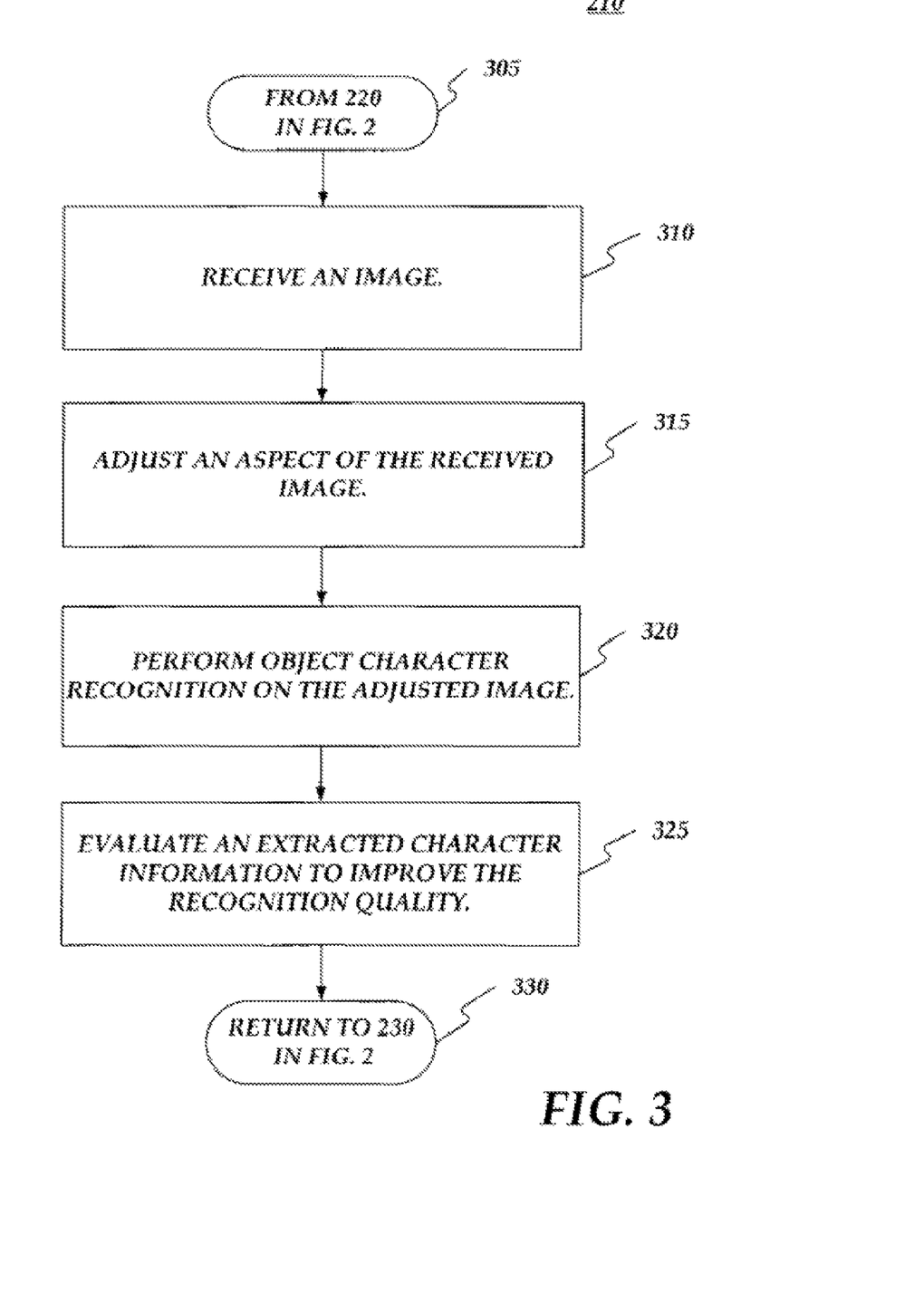
FIG. 3 is a flow chart of a subroutine used in the method of FIG. 2 for converting text.
Figure 4:
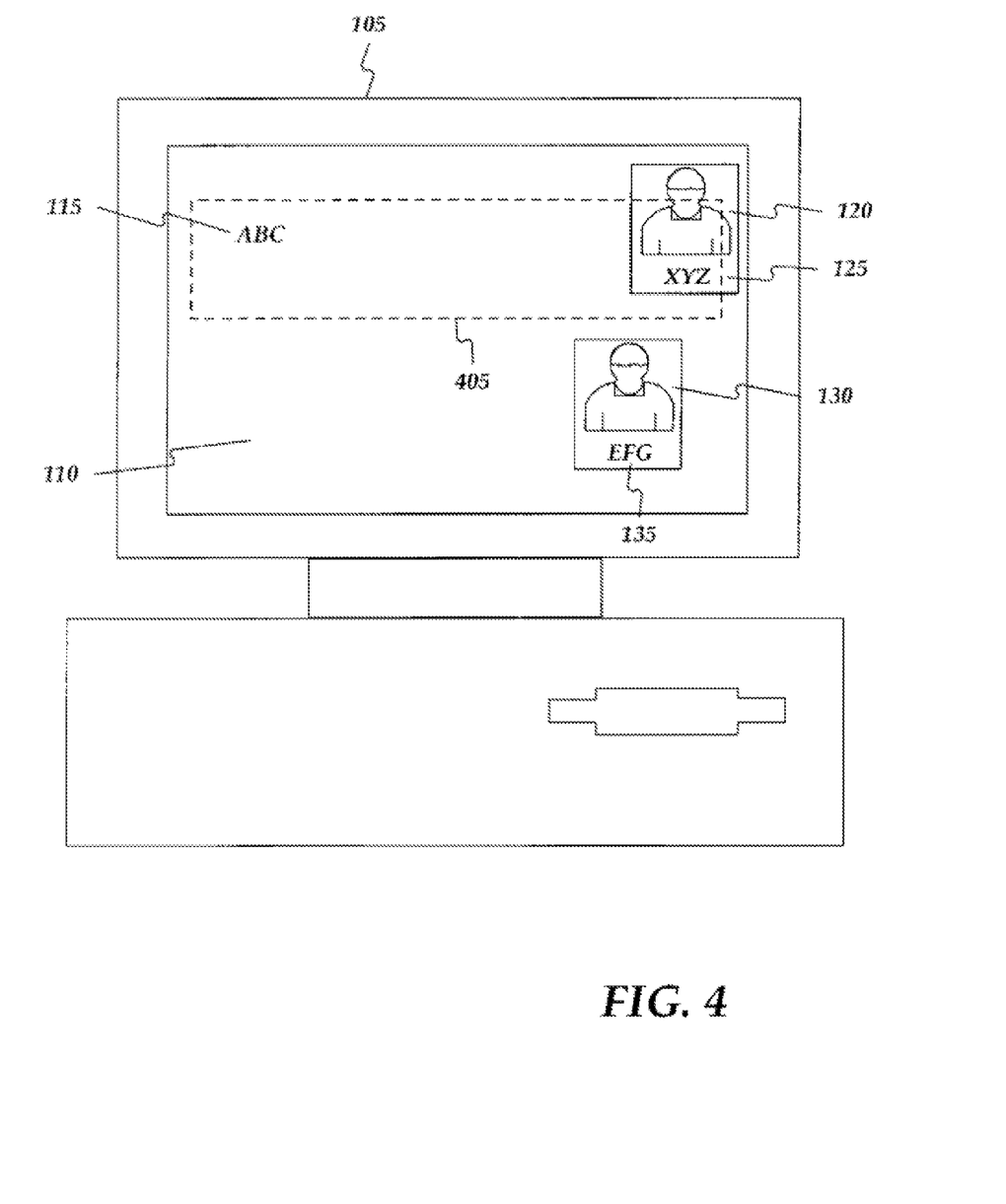
FIG. 4 is another operating environment.

FIG. 2 is a flow chart setting forth the general stages involved in a method 200 consistent with embodiments of the invention for converting text. Method 200 may be implemented using computing device 105 as described in more detail below with respect to FIG. 5. Ways to implement the stages of method 200 will be described in greater detail below with respect to FIG. 2, FIG. 3, and FIG. 4. FIG. 3 shows a flow chart of a subroutine used in the method of FIG. 2 for converting text. FIG. 4 shows an operating environment.

Method 200 may begin at starting block 205 and proceed to stage 210 where computing device 105 may convert second text 125 within first image 120 located in an electronic document to character information. For example, second text 125 may be converted to characters "X", "Y", and "Z". Ways to implement subroutine 210 will be described in greater detail below with respect to FIG. 3.

From stage 210, where second text 125 may be converted to character information, method 200 may advance to subroutine 220 where a user, using computing device 105, may select a selection text with a user selectable element 405 as shown in FIG. 4. The selection text may include visible embedded text or a picture of text location within an image. A user may wish to copy text shown in the electronic document. In order to do this, the user may cover any text (e.g. selection text) the user wishes to copy with the user selectable element. The selection text may comprise first text 115 within electronic document 110 and second text 125 within first image 120 located in electronic document 110. For example, user selectable element 405 may be used to select first text 115 and second text 125. User selectable element 405 may be selected by clicking and dragging an input device 514 (e.g. a point device such as a mouse) to create the user selectable element

405. In addition, user selectable element 405 may be selected by selecting a bounding box. The bounding box may be returned from an optical character recognition process. In addition, the optical character recognition process may return coordinates for each letter, word, line of text, etc.

From subroutine 220, where may select the selection text with the user selectable element, method 200 may advance to stage 230 where computing device 105 may highlight second text 125. For example, second text 125 may be highlighted upon temporarily pausing input device 514 over second text 125. Furthermore, second text 125 may provide an indication that second text 125 (highlighted text) may be selectable. For example, upon temporarily pausing input device 514 over second text 125, second text 125 may blink, change color, change font, change format, etc. Once computing device 105 highlights second text 125 in stage 230, method 200 may then end at stage 240.

FIG. 3 is a flow chart setting forth the general stages involved in subroutine 210 consistent with embodiments of the invention for converting text. Subroutine 210 may begin at starting block 305 and proceed at stage 310 where computing device 105 may receive first image 125. First image 125 may have image character information. The image character information may comprise text, text location corresponding to the text, data indicting a source of image 120, and other information. Furthermore, image 130 may have an image type. The image type may comprise a camera image, a screen clipping, a screen capture, a webcam photo, a picture from a camera phone, etc. First image 120 may be a high or low resolution image.

From stage 310, where computing device 105 receives first image 120, subroutine 210 may advance to stage 315 where computing device 105 may adjust an aspect of first image 120 based on the image type. For example, computing device 105 may pad first image 120's edges. Padding first image 120 may include adding space around the image so that second text 125 may have a minimum margin. For example, second text 125 in first image 120 may have a boundary of 100 pixels. In stage 315, computing device 105 may pad first image 120 so that second text 125 has a boundary of 150 pixels. Aspect adjustments to first image 120 may improve the probability that second text in first image 120 may be recognized using OCR.

Furthermore, adjusting the aspect of first image 120 may include, for example, removing elements of first image 120 that may hinder character recognition. For example, first image 120 may be a screen capture of a word processing program which places a proofing mark within the document. The proofing mark may interfere with the optical character recognition process. For example, the word processing program may place a red line under misspelled word. While adjusting the aspect of first image 120, computing device 105 may remove the red line, any other underlining, or other proofing marks.

In addition, computing device 105 may adjust the aspect of first image 120 based on a resolution of first image 120. For example, first image 120 may have been taken with a digital camera. The digital camera may have a high resolution (e.g. digital camera) or low resolution (e.g. camera phone, webcam). For high resolution images, adjustments may or may not be necessary. However, for low resolution images, individual pixels may need to be adjusted or "cleaned up" so that the embedded text may be more recognizable during OCR.

Computing device 105 may also adjust first image 120 based on an image resolution to help better distinguish characters. In addition, computing device 105 may adjust first image 120 based on a text scale. The text scale may be based on a pixel size of first image 120. For example, first image 120 may have a stray "dot" located over a lowercase "L." The stray dot may be removed so that the lowercase "L" may not be mistaken for an "i," for example.

Furthermore, computing device 105 may perform a light adjustment on first image 120. For example, first image 120 may over or under exposed. Consequently, computing device 105 may invoke a light adjustment application 522 help correct exposure or other lighting issues.

From stages 315, where computing device 105 adjusts the aspects of first image 120, subroutine 210 may advance to stage 320 where computing device 105 may perform optical character recognition on the adjusted first image 120. This optical character recognition process may extract the character information and corresponding location information for the characters on adjusted first image 120. For example, the optical character recognition process may return first text 125 as characters "X," "Y," and "Z." In addition, the optical character recognition process may return location information for first text 125. For example, the location information may include, a page number, a line number, a paragraph number, a pixel location on a display screen, a coordinate within a plane, etc.

From stage 320, where computing device 105 performs optical character recognition, subroutine 210 may advance to stage 325 where computing device 105 may evaluate the extracted character information to improve a recognition quality of the extracted character information as compared to the image character information (e.g. first text 125). For example, an environment element of the adjusted image may be used to determine the extracted character. The environmental element, for example, may be a character or a word. If the environmental element is a word, grammar information may be used to help determine the character.

A confidence level may be assigned to the extracted character. The confidence level may be an accuracy measure. For example, the optical character recognition process may return "L" with a confidence of zero on a scale of 0-100. Furthermore, the optical character recognition process may return "I" with a confidence of 95. In this case, the "L" may be replaced with the "I" to return the correct character.

Still consistent with embodiments of the invention, multiple optical character recognition processes may be implemented. For example, a default optical character recognition may be implemented. The default optical character recognition may return a first confidence level. If the first confidence level is lower than a minimum confidence level, a second optical character recognition process may be implemented. The second optical character recognition process may return a second confidence level. If the second confidence level is lower than the minimum confidence level, a third optical character recognition process may be implemented. The chain of optical character recognition process may continue until the returned confidence level exceeds the minimum confidence level or a maximum number of optical character recognition processes have been implemented.

In addition, the returned character may be part of a word. The word may be determined by comparing the words in a dictionary. For example, the extracted characters returned may be "the" and the evaluation process may compare this to words in a dictionary and may determine that "the" may really be "the." Furthermore, a grammar module may be used to assist in valuating the extracted text of a sentence level. From stage 325, where computing device 105 evaluates the extracted character information, subroutine 210 may advance to stage 330 where computing device 105 may return to stage 230 (FIG. 2).

An embodiment consistent with the invention may comprise a system for providing converting text. The system may comprise a memory storage and a processing unit coupled to the memory storage. The processing unit may be operative to select, with a user selectable element, a selection text comprising a first text within an electronic document and a second text within an image located in the electronic document. In addition, the processing unit may be operative to convert, in response to selecting the section text, the second text within the image to character information.

Another embodiment consistent with the invention may comprise a system for providing selecting text. The system may comprise a memory storage and a processing unit coupled to the memory storage. The processing unit may be operative to receive an image having image character information and an image type. Furthermore, the processing unit may be operative to adjust an aspect of the received image based on the image type. In addition, the processing unit may be operative to perform optical character recognition on the adjusted image to extract character information comprising characters and corresponding location information for the characters on the adjusted image. Moreover, the processing unit may be operative to evaluate the extracted character information to improve the recognition quality of the extracted character information as compared to the image character information.

Yet another embodiment consistent with the invention may comprise a system or providing selecting text. The system may comprise a memory storage and a processing unit coupled to the memory storage. The processing unit may be operative to select, with a user selectable element, a selection text comprising a first text within an electronic document and a second text within an image located in the electronic document. In addition, the processing unit may be operative to convert, in response to selecting the selection text, the second text within the image to character information. The processing unit being operative to convert the second text within the image to character information may comprise the processing unit being operative to receive the image having an image type and to adjust an aspect of the received image based on the image type. In addition, the processing unit being operative to convert may comprise the processing unit being operative to perform optical character recognition on the adjusted image to extract character information comprising characters and corresponding location information for the characters on the adjusted image. Furthermore, the processing unit being operative to convert may comprise the processing unit being operative to evaluate the extracted character information to improve the recognition quality of the extracted character information as compared to the second text. The processing unit may be further operative to paste the selected text into another electronic document.

Figure 5:
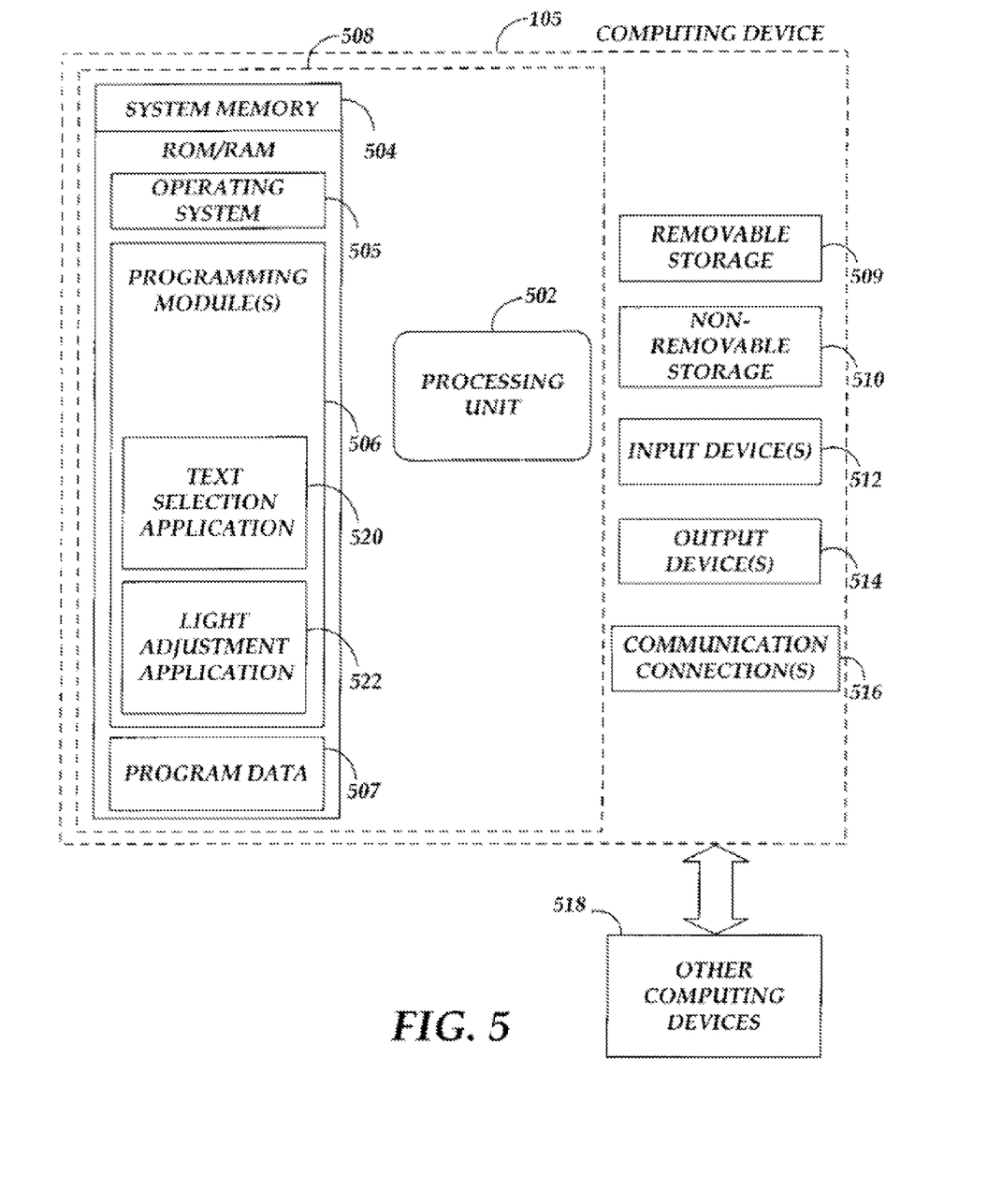
FIG. 5 is a block diagram of a system including a computing device.

FIG. 5 is a block diagram of a system including computing device 105. Consistent with an embodiment of the invention, the aforementioned memory storage and processing unit may be implemented in a computing device, such as computing device 105 of FIG. 5. Any suitable combination of hardware may be used to implement the memory storage and processing unit. For example, the memory storage and processing unit may be implemented with computing device 105 or any of other computing devices 518, in combination with computing device 105. The aforementioned system, device, and processors are examples and other systems, devices, and processors may comprise the aforementioned memory storage and processing unit, consistent with embodiments of the invention.

Consistent with embodiments of the present invention, a text editor is any program which allows both text and images to be combined in an electronic document. Examples of text editors include MICROSOFT WORD, MICROSOFT POWERPOINT, MICROSOFT FRONTPAGE, MICROSFT ONENOTE, MICROSOFT VISIO, and MICROSOFT PUBLISHER.

With reference to FIG. 5, a system consistent with an embodiment of the invention may include a computing device, such as computing device 105. In a basic configuration, computing device 105 may include at least one processing unit 502 and a system memory 504. Depending on the configuration and type of computing device, system memory 504 may comprise, but is not limited to, volatile (e.g., random access memory (RAM)), non-volatile (e.g. read-only memory (ROM)), flash memory, or any combination. System memory 504 may include operating system 505, one or more programming modules 506, and may include a program data 507. Operating system 505, or example, may be suitable for controlling computing device 105's operation. In one embodiment, programming modules 506 may include a text selection application 520 and light adjustment application 522. Furthermore, embodiments of the invention may be practiced in conjunction with a graphics library, other operating systems, or any other application program and is not limited to any particular application or system. This basic configuration is illustrated in FIG. 5 by those components within a dashed line 508.

Computing device 105 may have additional features or functionality. For example, computing device 105 may also include additional data storage devices (removable and/or non-removable) such as, for example, magnetic disks, optional disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e. memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 105. Any such computer storage media may be part of computing device 105. Computing device 105 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

Computing device 105 may also contain a communication connection 516 that may allow computing device 105 to communicate with other computing devices 518, such as over a network in a distributed computing environment, for example, an intranet or the internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 504, including operating system 505. While executing on processing unit 502, programming module(s) 506 (e.g. text selection application 520 and light adjustment application 522) may perform processes including, for example, one or more method 200's stages as described above. The aforementioned process is an example, and processing unit 502 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practices with other computer system configurations, including hand-held devices, multiprocessor systems, microprocessors-based or programmable consumer electronics, microcomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article or manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable readable storage medium having computer-usable or computer-readable program code embodied in the medium for use by or a connection with an instruction execution system. A computer-usable or computer-readable medium may be any medium that can contain, store, communicated, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following an electrical connection have one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

We claim:
1. A method for converting text, the method comprising:
   selecting, with a user selectable element, a selection text comprising a first text within an electronic document and a second text within an image located in the electronic document; and
   converting, by a computer, in response to selecting the selection text, the second text within the image to character information, wherein converting the second text within the image to the character information comprises:

receiving the image having an image type and image character information;

adjusting an aspect of the received image based on the image type;

performing optical character recognition on the adjusted image to extract the character information comprising characters and corresponding location information for the characters on the adjusted image, the location information comprising at least one of the following: a page number, a line number, a paragraph number, a pixel location, and a coordinate within a plane; and evaluating the extracted character information to improve recognition quality of the extracted character information as compared to the second text; and pasting the selection text into another electronic document.

2. The method of claim 1, wherein evaluating the extracted character information to improve the recognition quality of the extracted word information as compared to received character information further comprises assigning a confidence level to the extracted word and interpret the confidence level to determine if the extracted word matches a dictionary word.

3. The method of claim 1, wherein adjusting the aspect of the received image based on the image type further comprises adjusting the aspect of the received image based on the image type comprising padding the received image to create a boundary around the received image.

4. The method of claim 1, wherein adjusting the aspect of the received image based on the image type further comprises removing at least one proofing mark from the received image.

5. The method of claim 1, wherein adjusting the aspect of the received image based on the image type further comprises performing a light adjustment on the received image.

6. A computer-readable storage medium device that stores a set of instructions, which when executed performs a method for converting text, the method executed by the set of instructions comprising:

selecting, with a user selectable element, a selection text comprising a first text within an electronic document and a second text within an image located in the electronic document; and converting, in response to selecting the selection text, the second text within the image to character information, wherein converting the second text within the image to the character information comprises:

receiving the image having an image type and image character information;

adjusting an aspect of the received image based on the image type;

performing optical character recognition on the adjusted image to extract the character information comprising characters and corresponding location information for the characters on the adjusted image, the location information comprising at least one of the following: a page number, a line number, a paragraph number, a pixel location, and a coordinate within a plane; and evaluating the extracted character information to improve recognition quality of the extracted character information as compared to the second text; and pasting the selection text into another electronic document.

7. The computer-readable medium of claim 6, wherein evaluating the extracted character information to improve the recognition quality of the extracted word information as compared to received character information further comprises assigning a confidence level to the extracted word and interpret the confidence level to determine if the extracted word matches a dictionary word.

8. The computer-readable medium of claim 6, wherein adjusting the aspect of the received image based on the image type further comprises adjusting the aspect of the received image based on the image type comprising padding the received image to create a boundary around the received image.

9. The computer-readable medium of claim 6, wherein adjusting the aspect of the received image based on the image type further comprises removing at least one proofing mark from the received image.

10. The computer-readable medium of claim 6, wherein adjusting the aspect of the received image based on the image type further comprises performing a light adjustment on the received image.

11. A system for converting text, the system comprising:
a memory storage; and
a processing unit coupled to the memory storage, wherein the processing unit is operative to:

select, with a user selectable element, a selection text comprising a first text within an electronic document and a second text within an image located in the electronic document; and convert in response to selecting the selection text, the second text within the image to character information, wherein the processing unit being operative to convert the second text within the image to the character information comprises the processing unit being operative to:

receive the image having an image type and image character information;

adjust an aspect of the received image based on the image type; perform optical character recognition on the adjusted image to extract the character information comprising characters and corresponding location information for the characters on the adjusted image, the location information comprising at least one of the following: a page number, a line number, a paragraph number, a pixel location, and a coordinate within a plane; and evaluate the extracted character information to improve recognition quality of the extracted character information as compared to the second text; and paste the selection text into another electronic document.

12. The system of claim 11, wherein the processing unit being operative to evaluate the extracted character information to improve the recognition quality of the extracted word information as compared to received character information further comprises the processing unit being operative to assign a confidence level to the extracted word and interpret the confidence level to determine if the extracted word matches a dictionary word.

13. The system of claim 11, wherein the processing unit being operative to adjust the aspect of the received image based on the image type further comprises the processing unit being operative to adjust the aspect of the received image based on the image type comprises the processing unit being operative to padding the received image to create a boundary around the received image.

14. The system of claim 11, wherein the processing unit being operative to adjust the aspect of the received image based on the image type further comprises the processing unit being operative to remove at least one proofing mark from the received image.

15. The system of claim 11, wherein the processing unit being operative to adjust the aspect of the received image based on the image type further comprises the processing unit being operative to perform a light adjustment on the received image.

* * * * *